United States Patent [19]

Yoshioka et al.

[11] Patent Number: 4,753,976

[45] Date of Patent: Jun. 28, 1988

[54] HEAT RESISTANT RUBBER COMPOSITION HAVING IMPROVED MECHANICAL PROPERTIES

[75] Inventors: Hiroshi Yoshioka; Ichiro Ono, both of Annaka; Hitoshi Uehara, Matsuida, all of Japan

[73] Assignee: Shin-Etsu Chemical Co., Ltd., Tokyo, Japan

[21] Appl. No.: 899,092

[22] Filed: Aug. 22, 1986

[30] Foreign Application Priority Data

Aug. 28, 1985 [JP] Japan ................................. 60-189030

[51] Int. Cl.$^4$ ............................ C08K 3/36; C08K 9/06
[52] U.S. Cl. ................................ 524/575.5; 523/209; 523/213; 524/566; 524/567; 524/571
[58] Field of Search ............................ 524/571, 575.5; 523/209, 213

[56] References Cited

U.S. PATENT DOCUMENTS

| | | | |
|---|---|---|---|
| 3,468,751 | 9/1969 | Tesoro | 523/209 |
| 3,798,196 | 3/1974 | Rocktaschel et al. | 524/571 |
| 3,873,489 | 3/1975 | Thorn et al. | 524/571 |
| 4,044,037 | 8/1977 | Moi et al. | 525/29 |
| 4,099,981 | 7/1978 | Moi et al. | 428/405 |
| 4,113,696 | 9/1978 | Williams et al. | 523/213 |
| 4,128,438 | 12/1978 | Wolff et al. | 524/575 |
| 4,143,027 | 3/1979 | Sollman et al. | 524/571 |
| 4,151,157 | 4/1979 | Williams et al. | 523/213 |
| 4,156,677 | 5/1979 | Williams et al. | 523/213 |
| 4,292,234 | 9/1981 | Borel | 524/575 |
| 4,299,333 | 11/1981 | Wolff et al. | 524/571 |
| 4,436,847 | 3/1984 | Wagner | 524/571 |
| 4,514,231 | 4/1985 | Kerner et al. | 523/213 |
| 4,519,430 | 5/1985 | Ahmed et al. | 524/571 |

*Primary Examiner*—John C. Bleutge
*Assistant Examiner*—David W. Woodward
*Attorney, Agent, or Firm*—Hopgood, Calimafde, Kalil, Blaustein & Judlowe

[57] ABSTRACT

The rubber composition without formulating a carbon black filler has a remarkably low Mooney viscosity and still is capable of giving a rubber vulcanizate having excellent mechanical properties. The rubber composition comprises, in addition to natural rubber or a diene-based synthetic rubber and a non-carbon inorganic filler, a specific poly(dialkoxysiloxane) terminated at each molecular chain end with a polysulfide linkage-containing group of the formula $(RO)_3Si-R^1-S_x-R^1-$ bonded to the terminal silicon atom, in which R is an alkyl group, e.g. methyl and ethyl, $R^1$ is a divalent hydrocarbon group, e.g. $-CH_2CH_2CH_2$13 , and x is a positive integer of 2 to 6 or, typically, 4.

3 Claims, No Drawings

HEAT RESISTANT RUBBER COMPOSITION HAVING IMPROVED MECHANICAL PROPERTIES

BACKGROUND OF THE INVENTION

The present invention relates to a rubber composition or, more particularly, to a rubber composition based on natural rubber or a diene-based synthetic rubber having a relatively low Mooney viscosity before vulcanization to give an advantage of good processability but capable of giving a vulcanizate having excellent mechanical properties such as tensile strength, tear strength, elastic modulus, stress-strain characteristics, elastic resilience and anti-wearing resistance even without formulating a carbon black filler.

In comparison with a rubber composition formulated with a carbon black filler, as is well known, rubber compositions based on natural rubber or a diene-based synthetic rubber and formulated with a non-carbon inorganic filler are inferior in respect of the poor processibility of the unvulcanized rubber composition and the low mechanical properties of the vulcanizate thereof such as tensile strength, tear strength, elastic modulus, stress-strain characteristics, elastic resilience and anti-wearing resistance because the inorganic filler inherently has no affinity with the polymeric rubbery constituent and exhibits no reinforcing effect as a result of formation of the so-called carbon gel formed in the rubber compositions loaded with a carbon black filler.

Various proposals and attempts have been made hitherto to achieve an improvement of rubber compositions in this regard. For example, Japanese Patent Publication No. 51-28623 and Japanese Patent Kokai No. 52-83527 propose a method of adding a sulfur-containing organosilicon compound to such a rubber composition. This method is indeed effective to give substantial improvements in the tensile strength, tear strength, elastic modulus and stress-strain characteristics in the vulcanizates in comparison with those obtained by formulating the composition with carbon black. The degree of improvement achieved by this method, however, is still insufficient requiring, in particular, further improvements in the anti-wearing resistance and mechanical strengths of the vulcanizates at elevated temperatures.

SUMMARY OF THE INVENTION

The present invention therefore has an object to provide a rubber composition free from the above described problems and disadvantages in the prior art rubber compositions. The rubber composition of the invention comprises:

(a) 100 parts by weight of natural rubber or a diene-based synthetic rubber;
(b) from 5 to 100 parts by weight of an inorganic filler; and
(c) from 0.1 to 20 parts by weight of a polysulfide linkage-containing organopolysiloxane represented by the general formula

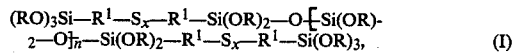
(I)

in which each R is, independently from the others, an alkyl group having from 1 to 4 carbon atoms, $R^1$ is a divalent hydrocarbon group having from 1 to 10 carbon atoms, x is a positive integer of from 2 to 6 and n is a positive integer of from 1 to 5.

DETAILED DESCRIPTION OF THE PREFERRED EMBODIMENTS

As is understood from the above given summarizing description, the most characteristic feature of the inventive rubber composition is the formulation thereof with the very specific polysulfide linkage-containing organopolysiloxane represented by the general formula (I). When the rubber composition is compounded by formulating the specific organopolysiloxane in an appropriate amount and in an appropriate manner of addition, the rubber composition is imparted with a remarkably decreased Mooney viscosity to give good processibility before vulcanization and still capable of giving vulcanizates having greatly improved mechanical properties such as tensile strength, tear strength, elastic modulus, stress-strain characteristics, elastic resilience and anti-wearing resistance.

The rubbery constituent as the component (a) in the inventive rubber composition is natural rubber or a diene-based synthetic rubber. The diene-based synthetic rubber here implied is a rubbery polymer obtained by the polymerization of a diene compound or a copolymerization of a monomer mixture composed of an at least substantial amount of a diene compound and one or more of other comonomers. Examples of the diene-based synthetic rubber include styrene-butadiene copolymers, polybutadiene rubbers, polyisoprene rubbers, acrylonitrile-butadiene copolymers, ternary copolymers of ethylene, propylene and a diene monomer, polychloroprene rubbers, brominated or chlorinated butyl rubbers and the like. These rubbers may be used either singly or as a combination of two kinds or more according to need.

The component (b) compounded with natural rubber or the above described diene-based synthetic rubber is a non-carbon inorganic filler exemplified by silica fillers such as finely divided silica flours, e.g. fumed and precipitated silica fillers and silica aerogel, and finely pulverized quartz powder, vitreous fillers such as glass powder, glass beads and glass fibers, metal silicate fillers such as calcium silicate, magnesium silicate and aluminum silicate, metal oxides such as aluminum oxide titanium dioxide and zinc oxide and others, of which silica fillers are preferred. The amount of the inorganic filler compounded with the component (a) should be in the range from 5 to 100 parts by weight or, preferably, from 10 to 70 parts by weight per 100 parts by weight of the component (a). When the amount of the filler is too small, the rubber composition cannot be imparted with sufficient reinforcing effect so that the vulcanizate thereof may have poor mechanical properties. When the amount of the filler is too large, on the other hand, the processibility of the rubber composition is greatly decreased due to the increase in the consistency of the composition.

The component (c), which is the most characteristic ingredient in the inventive rubber composition, is a polysulfide linkage-containing organopolysiloxane represented by the general formula (I) given above, in which each of the symbols has the meaning defined below. Namely, each of the groups denoted by R is an alkyl group having from 1 to 4 carbon atoms selected, independently from the others, from the class consisting of methyl, ethyl, propyl and butyl groups. Each of these alkyl groups is bonded to the silicon atom of the siloxane structure always through an oxygen atom or, in other words, in the form of an alkoxy group which is readily hydrolyzed by reacting with water in the rubber composition or, in particular, in the inorganic filler contained in the form of adsorbed water or water of crystallization to be converted into a silanolic hydroxy group. It is then presumable that the organopolysiloxane as the component (c) having the alkoxy groups converted into silanolic hydroxy groups is readily adsorbed on or chemically bonded to the surface of the inorganic filler and fixed thereon to exhibit the remarkable effects of improvement as desired. Namely, this component (c) may serve as a coupling agent between the rubbery polymer and the inorganic filler contributing to the improvements in the unvulcanized rubber composition and the vulcanizates thereof. In this regard, the group denoted by the symbol R should preferably be a methyl or an ethyl group in view of the relatively high velocity of hydrolysis when the group RO is a methoxy or ethoxy group.

The group denoted by $R^1$, which is a linking unit between the terminal trialkoxysilyl group and the polysulfide linkage or between the terminal silicon atom in the polysiloxane linkage and the polysulfide linkage, is a divalent hydrocarbon group having from 1 to 10 carbon atoms including aliphatic and aromatic ones. Typical and preferable examples of the group denoted by $R^1$ include those expressed by the following formulas, in which Me and $C_6H_4$ are methyl and phenylene groups, respectively: $-CH_2-$; $-CH_2CH_2-$; $-CH_2CH_2CH_2-$; $-CH_2CH_2CH_2CH_2-$; $-CH_2CHMeCH_2-$; $-C_6H_4-$; $-CH_2CH_2C_6H_4CH_2-$; and the like. Among these divalent groups, the most preferable is the propylene group $-CH_2CH_2CH_2-$ from the standpoint of easiness in the preparation of the component (c).

The value of the subscript x in the general formula (I) is a positive integer of form 2 to 6 or, preferably, 4. It should be noted here that an organopolysiloxane of the formula (I) composed of the molecules, all of which have the value of x equal to 4, can rather hardly be obtained in a conventional synthetic procedure using sulfur monochloride as the sulfidizing reagent for the polysulfide linkage because of the disproportionation reaction readily taking place under certain reaction conditions so that the value of x in the polysulfide linkages usually ranges from 2 to 6. The subscript n is a positive integer of from 1 to 5. An organopolysiloxane having n equal to zero, i.e. a disiloxane compound, is inferior in the coupling effect between the components (a) and (b) so that the vulcanizate obtained by curing the rubber composition formulated with such a disiloxane compound may have low mechanical properties or, in particular, insufficiently improved high-temperature characteristics. On the other hand, no further advantageous effect can be obtained even by use of a polysulfide linkage-containing organopolysiloxane having n larger than 5 as the component (c) or rather the relative effectiveness of the polysulfide linkage-containing organopolysiloxane may be decreased due to the decreased contribution of the polysulfide linkages therein.

The amount of the component (c) in the inventive rubber composition should be in the range from 0.1 to 20 parts by weight or, preferably, from 0.5 to 10 parts by weight per 100 parts by weight of the rubbery constituent as the component (a). When the amount of the component (c) is too small, the desired advantageous effects by this component cannot be expected as a matter of course while an excessively large amount thereof may give no further additional advantages rather with some adverse influences on the rubbery elongation or flexibility of the vulcanizates if not to mention the economical disadvantage due to the expensiveness of the compound.

Typical polysulfide linkage-containing organopolysiloxanes as the component (c) include those expressed by the following structural formulas, in which the symbols Me and Et denote a methyl and an ethyl group, respectively:

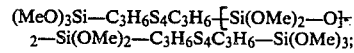
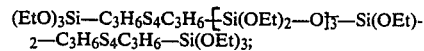

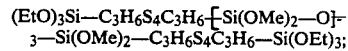
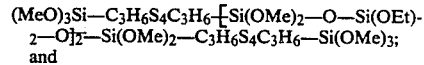

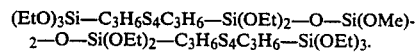
and

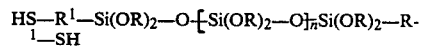

These polysulfide linkage-containing organopolysiloxanes can be prepared by either of the following synthetic methods. Firstly, a sulfur chloride and a mercaptoalkyl trialkoxysilane of the formula $(RO)_3SiR^1SH$ are reacted to give a chloropolythioalkyl trialkoxysilane of the formula $(RO)_3SiR^1S_{(x-1)}Cl$ which is then subjected to a dehydrochlorination reaction with a mercaptoalkyl alkoxy polysiloxane of the formula

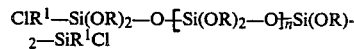

to form the desired polysulfide linkage-containing organopolysiloxane of the general formula (I). Secondly, a chloroalkyl trialkoxy silane of the formula $ClR^1Si(OR)_3$ is reacted with sodium sulfide to give a compound of the formula $(RO)_3SiR^1-S_{(x-1)}Na$, which is then reacted with a chloroalkyl-terminated poly(-dialkoxy)siloxane of the formula $$ClR^1-Si(OR)_2-O{\text -}[Si(OR)_2-O]_n Si(OR)_2-SiR^1Cl$$

to form the desired organopolysiloxane of the general formula (I).

The rubber composition of the invention is prepared by uniformly blending the above described components (a), (b) and (c) together with other optional additives. Although the order of mixing of these three components is not particularly limitative, it is sometimes advantageous that the component (c) is mixed with the other components as diluted with a process oil or the inorganic filler as the component (b) is first mixed with the component (c) and the thus treated filler is compounded with the component (a). The pretreatment of the inorganic filler as the component (b) with the organopolysiloxane as the component (c) can be performed by any convenient procedure but it is preferable to ensure uniformity of the treatment that the organopolysiloxane is diluted with a suitable volume of an alcohol or an aqueous alcohol mixture to give an alcoholic solution of the organopolysiloxane with which the inorganic filler is thoroughly blended.

The rubber composition of the invention is vulcanizable with sulfur as the vulcanizing agent so that the composition should be admixed with 0.1 to 4% by weight of sulfur, 2 to 5% by weight of zinc oxide and 0.2 to 5% by weight of a vulcanization accelerator. Suitable vulcanization accelerators include thiourea-based ones, guanidine-based ones, thiazole-based ones, sulfenamide-based ones, dithiocarbamine-based ones, thiuram-based ones, salts of xanthogenic acid and others. These vulcanization accelerators can be used either alone or as a combination of two kinds or more according to need. The inventive rubber composition may optionally be admixed with various kinds of known additives such as aging retarders, antioxidants, process oils, plasticizers, body pigments, carbon black, vulcanization retarders, coloring materials and the like according to need.

In the following, the rubber composition of the invention is described in more detail by way of examples and comparative examples as preceded by the description of the preparation of the polysulfide linkage-containing organopolysiloxanes as the component (c). In the following description, the expression of "parts" always refers to "parts by weight" and the values of viscosity are all those obtained by the measurement at 25° C.

Preparation 1

Into a glass-made flask of 1.5-liter capacity equipped with a stirrer, reflux condenser, thermometer and dropping funnel were introduced 135 g (1 mole) of sulfur chloride and 600 g of n-hexane to form a reaction mixture into which 196 g (1 mole) of 3-mercaptopropyl trimethoxy silane were added dropwise over a period of 2 hours with agitation. As the silane was added, hydrogen chloride gas was evolved from the reaction mixture in the flask exothermically to increase the temperature of the reaction mixture from 25° C. to 46° C. After completion of the dropwise addition of the silane compound, the mixture was heated and kept at 60° C. under bubbling of dry nitrogen gas thereinto for 3 hours to complete the reaction along with removal of the hydrogen chloride remaining in the mixture followed by cooling to room temperature.

Thereafter, 226 g (0.5 mole) of 1,5-bis(3-mercaptopropyl)-1,1,3,3,5,5-hexamethoxy trisiloxane of the formula

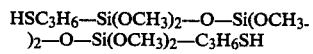

were added dropwise into the reaction mixture in the flask over a period of 30 minutes so that the temperature of the mixture was increased to 53° C. by the exothermic reaction. After completion of the dropwise addition of the trisiloxane compound, heating of the reaction mixture was continued for further 3 hours under reflux of n-hexane to complete the reaction followed by the addition of 8.6 g of triethylamine to neutralize hydrogen chloride and filtration of the mixture to remove the precipitated triethylamine hydrochloride. Stripping of the n-hexane from the filtrate solution by distillation gave 426 g of a yellow liquid as the product having a viscosity of 11 centistokes, specific gravity of 1.15 and refractive index of 1.508.

The results of the infrared absorption spectrometric and elementary analyses supported that this product was a tetrasulfide linkage-containing organopolysiloxane of the formula

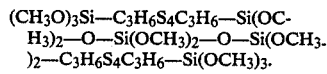

Preparation 2

The synthetic procedure was substantially the same as in Preparation 1 except that the reactants used here and the amounts thereof were 135 g (1 mole) of sulfur chloride, 600 g of n-hexane, 238 g (1 mole) of 3-mercaptopropyl triethoxy silane, 335 g (0.5 mole) of 1,7-bis(3-mercaptopropyl)-1,1,3,3,5,5,7,7-octaethoxy tetrasiloxane of the formula

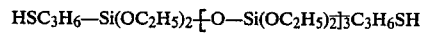

and 9.3 g of triethylamine to give 533 g of a yellow liquid product having a viscosity of 23 centistokes, specific gravity of 1.17 and refractive index of 1.508.

The results of the infrared absorption spectrometric and elementary analyses supported that this product was a tetrasulfide linkage-containing organopolysiloxane of the formula

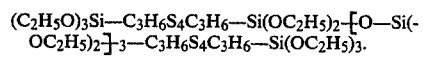

Preparation 3

Into a glass-made flask of 2-liter capacity equipped with a stirrer, reflux condenser, thermometer and dropping funnel were introduced 174 g (1 mole) of sodium sulfide $Na_2S_4$ and 800 g of anhydrous ethyl alcohol to form a reaction mixture into which 240.5 g (1 mole) of 3-chloropropyl triethoxy silane were added dropwise over a period of 45 minutes with agitation while the reaction mixture in the flask was kept at 60° C. As the silane was added, the temperature of the reaction mixture was slightly increased up to 67° C. by the exothermic reaction. After completion of the dropwise addition of the silane compound, the mixture was heated for further 3 hours under reflux of ethyl alcohol to complete the reaction followed by cooling to room temperature.

Thereafter, 538.5 g (0.5 mole) of 1,13-bis(3-chloropropyl)-tetradecaethoxy heptasiloxane of the formula

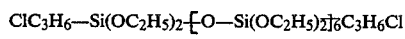

were added dropwise into the reaction mixture in the flask over a period of 30 minutes and the reaction mixture was heated for further 5 hours under reflux of ethyl alcohol to complete the reaction followed by cooling to room temperature and filtration of the mixture to remove the precipitated sodium chloride. Stripping of the ethyl alcohol from the filtrate solution by distillation gave 721 g of a yellow liquid as the product having a viscosity of 51 centistokes, specific gravity of 1.20 and refractive index of 1.501.

The results of the infrared absorption spectrometric and elementary analyses supported that this product was a tetrasulfide linkage-containing organopolysiloxane of the formula

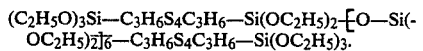

Examples 1 to 3 and Comparative Examples 1 and 2

Rubber compositions in Examples 1, 2 and 3 were prepared each by uniformly blending, in a 6-inch two-roller mill, 100 parts of natural rubber No. III with 50 parts of a precipitated silica filler (Nipsil AQ, a product of Nippon Silica Co.), 2 parts of the polysulfide linkage-containing organopolysiloxane prepared in Preparation 1, 2 or 3, respectively, 2 parts of sulfur, 10 parts of a process oil (Aroma 790, a product by Nippon Sun Oil Co.), 5 parts of zinc oxide, 2 parts of stearic acid, 0.5 part of diphenyl guanidine, 0.5 part of 2-mercaptobenzothiazole and 0.5 part of N-hydroxydiethylene-2-benzothiazole sulfenamide. For comparison, two further rubber compositions were prepared in Comparative Examples 1 and 2 each in the same formulation as above excepting omission of the organopolysiloxane in Comparative Example 1 and replacement of the organosiloxane with the same amount of a polysulfide linkage-containing organosilane compound of the formula $(C_2H_5O)_3SiC_3H_6S_4C_3H_6Si(OC_2H_5)_3$, which is a known compound disclosed in Japanese Patent Publication No. 51-28623, in Comparative Example 2. Each of these rubber compositions had a Mooney viscosity shown in Table 1 below. The rubber compositions were each vulcanized at 160° C. for 20 minutes into a rubber vulcanizate of which various mechanical properties were measured to give the results shown in Table 1.

The Akron abrasion test appearing in the table was undertaken according to British Standard 903 A-9 (1957) at an angle of abrasion of 25° using a reference specimen prepared from a rubber composition formulated with 100 parts of natural rubber No. III, 50 parts of carbon black ISAF, 10 parts of a process oil, 5 parts of zinc oxide, 2 parts of stearic acid, 0.5 part of dibenzothiazolyl sulfide, 0.5 part of N-hydroxydiethylene-2-benzothiazole sulfenamide and 2 parts of sulfur.

TABLE 1

|  | Example | | | Comparative Example | |
|---|---|---|---|---|---|
|  | 1 | 2 | 3 | 1 | 2 |
| Mooney viscosity $ML_{1+4}$, minutes | 35 | 32 | 39 | 68 | 43 |
| Hardness, JIS | 52 | 52 | 53 | 46 | 52 |
| Ultimate elongation, % | 542 | 533 | 526 | 660 | 538 |
| Tensile strength, kg/cm² | 97 | 107 | 94 | 55 | 82 |
| Tear strength, kg/cm | 28 | 32 | 29 | 18 | 26 |
| Elastic modulus at 100%, kg/cm² | 14 | 15 | 14 | 8 | 13 |
| Elastic modulus at 300%, kg/cm² | 45 | 47 | 42 | 21 | 36 |
| Tensile strength at 100° C., kg/cm² | 42 | 46 | 39 | 16 | 31 |
| Elastic modulus at 100% at 100° C., kg/cm² | 22 | 26 | 23 | 6 | 18 |
| Elastic resilience, % | 50 | 52 | 49 | 45 | 49 |
| Parmanent compression set, % | 33 | 31 | 34 | 66 | 39 |
| Akron abrasion, % | 141 | 128 | 158 | 397 | 189 |

Examples 4 to 12 and Comparative Examples 3 to 5

The formulations of the rubber compositions in Examples 4 to 6, Examples 7 to 9, Examples 10 to 12 and Comparative Examples 3 to 5 were the same as in Examples 1, 2 and 3 and Comparative Example 2, respectively, except that the amount of the polysulfide linkage-containing organopolysiloxane or organosilane compound was 1 part in Examples 4, 7 and 10 and Comparative Example 3, 4 parts in Examples 5, 8 and 11 and Comparative Example 4 and 8 parts in Examples 6, 9 and 12 and Comparative Example 5. Table 2 below shows the Mooney viscosity of the unvulcanized rubber compositions and the mechanical properties of the rubber vulcanizates obtained by the vulcanization at 160° C. for 20 minutes.

TABLE 2

|  | Example | | | | | | | | | Comparative Example | | |
|---|---|---|---|---|---|---|---|---|---|---|---|---|
|  | 4 | 5 | 6 | 7 | 8 | 9 | 10 | 11 | 12 | 3 | 4 | 5 |
| Mooney viscosity $ML_{1+4}$, minutes | 50 | 21 | 17 | 48 | 19 | 16 | 52 | 26 | 17 | 54 | 33 | 23 |
| Hardness, JIS | 49 | 57 | 61 | 50 | 57 | 62 | 50 | 58 | 62 | 50 | 57 | 61 |
| Ultimate elongation, % | 604 | 513 | 400 | 598 | 486 | 393 | 596 | 471 | 390 | 597 | 465 | 388 |
| Tensile strength, kg/cm² | 78 | 124 | 177 | 86 | 133 | 192 | 68 | 117 | 168 | 63 | 110 | 154 |
| Tear strength, kg/cm | 23 | 36 | 58 | 25 | 38 | 65 | 23 | 34 | 53 | 22 | 31 | 42 |
| Elastic modulus at 100%, kg/cm² | 11 | 20 | 89 | 12 | 22 | 93 | 11 | 19 | 73 | 11 | 18 | 34 |
| Elastic modulus at 300%, kg/cm² | 28 | 66 | 115 | 30 | 68 | 119 | 27 | 61 | 104 | 27 | 49 | 75 |
| Elastic resilience, % | 48 | 52 | 53 | 50 | 53 | 55 | 48 | 50 | 52 | 47 | 50 | 51 |
| Permanent compression set, % | 47 | 29 | 27 | 45 | 30 | 26 | 48 | 33 | 31 | 49 | 38 | 36 |

Examples 13 to 21 and Comparative Examples 6 to 9

The rubber compositions in these examples and comparative examples were prepared each by compounding 100 parts of a styrene-butadiene copolymeric synthetic rubber (SBR-1502, a product by Japan Synthetic Rubber Co.), 50 parts of a precipitated silica filler (Nipsil VN-3, a product by Nippon Silica Co.), 1 part of sulfur, 2 parts of diethyleneglycol, 10 parts of the same process oil as used in the preceding examples, 2 parts of zinc oxide, 2 parts of stearic acid, 1.2 parts of N-hydroxydiethylene-2-benzothiazole sulfenamide, 1.2 parts of dibenzothiazolyl sulfide and 1.0 part of diphenyl guanidine together with a polysulfide linkage-containing organopolysiloxane or organosilane compound given below. The rubber compositions in Examples 13, 14 and 15 were formulated with the organopolysiloxane prepared in Preparation 1 in amounts of 1, 2 and 4 parts, respectively, the compositions in Examples 16, 17 and 18 were formulated with the organopolysiloxane prepared in Preparation 2 in amounts of 1, 2 and 4 parts, respectively, and the compositions in Examples 19, 20 and 21 were formulated with the organopolysiloxane prepared in Preparation 3 in amounts of 1, 2 and 4 parts, respectively, while the compositions in Comparative Examples 6, 7 and 8 were formulated with the same organosilane compound as used in Comparative Example 2 in amounts of 1, 2 and 4 parts, respectively. The composition in Comparative Example 9 was prepared without using the polysulfide linkage-containing organosilicon compound at all. Table 3 below shows the Mooney viscosity of the unvulcanized rubber compositions and the mechanical properties of the rubber vulcanizates obtained by the vulcanization at 160° C. for 20 minutes.

TABLE 3

|  | Example |  |  |  |  |  |  |  |  | Comparative Example |  |  |  |
|---|---|---|---|---|---|---|---|---|---|---|---|---|---|
|  | 13 | 14 | 15 | 16 | 17 | 18 | 19 | 20 | 21 | 6 | 7 | 8 | 9 |
| Mooney viscosity $ML_{1+4}$, minutes | 72 | 56 | 50 | 70 | 55 | 47 | 73 | 58 | 52 | 76 | 58 | 54 | 98 |
| Hardness, JIS | 64 | 66 | 67 | 64 | 66 | 67 | 65 | 67 | 68 | 64 | 66 | 67 | 64 |
| Ultimate elongation, % | 742 | 525 | 350 | 739 | 518 | 317 | 737 | 516 | 313 | 735 | 518 | 316 | 860 |
| Tensile strength, kg/cm$^2$ | 171 | 198 | 159 | 185 | 201 | 172 | 172 | 189 | 156 | 168 | 180 | 151 | 143 |
| Tear strength, kg/cm | 49 | 59 | 59 | 50 | 63 | 64 | 48 | 58 | 58 | 48 | 57 | 58 | 33 |
| Elastic modulus at 100%, kg/cm$^2$ | 16 | 27 | 49 | 17 | 28 | 54 | 16 | 27 | 46 | 15 | 24 | 38 | 11 |
| Elastic modulus at 300%, kg/cm$^2$ | 35 | 86 | 144 | 37 | 93 | 159 | 33 | 78 | 130 | 29 | 77 | 126 | 20 |
| Elastic resilience, % | 48 | 50 | 52 | 49 | 51 | 53 | 47 | 50 | 51 | 47 | 49 | 51 | 45 |
| Permanent compression set, % | 35 | 20 | 18 | 33 | 19 | 16 | 38 | 23 | 20 | 38 | 24 | 22 | 60 |

Examples 22 to 24 and Comparative Examples 10 and 11

The rubber compositions in these examples and comparative examples were compounded each by blending 100 parts of a copolymeric synthetic rubber of ethylene, propylene and a diene monomer (EPT-3405, a product by Mitsui Petrochemical Co.), 50 parts of a precipitated silica filler (Nipsil VN-3, supra), 1.5 parts of sulfur, 10 parts of a process oil (R-1000, a product by Kyodo Petroleum Co.), 5 parts of zinc stearate, 1 part of stearic acid, 1 part of 2-mercaptobenzothiazole and 1.5 parts of tetramethylthiuram monosulfide.

The compositions in Examples 22, 23 and 24 were further admixed with 2.5 parts of the polysulfide linkage-containing organopolysiloxanes prepared in Preparations 1, 2 and 3, respectively, and the composition in Comparative Example 10 was admixed with 2.5 parts of the same organosilane compound as used in Comparative Example 2 while the composition in Comparative Example 11 was formulated with none of these polysulfide linkage-containing organosilicon compounds. Table 4 below shows the Mooney viscosity of the unvulcanized rubber compositions and the mechanical properties of the rubber vulcanizates obtained by the vulcanization at 160° C. for 20 minutes.

TABLE 4

|  | Example |  |  | Comparative Example |  |
|---|---|---|---|---|---|
|  | 22 | 23 | 24 | 10 | 11 |
| Mooney viscosity $M_{1+4}$, minutes | 52 | 47 | 55 | 56 | 81 |
| Hardness, JIS | 70 | 71 | 70 | 70 | 70 |
| Ultimate elongation, % | 416 | 405 | 397 | 403 | 637 |
| Tensile strength, kg/cm$^2$ | 85 | 88 | 73 | 63 | 42 |
| Tear strength, kg/cm | 36 | 38 | 35 | 35 | 25 |
| Elastic modulus at 100%, kg/cm$^2$ | 34 | 39 | 38 | 25 | 18 |
| Elastic modulus at 300%, kg/cm$^2$ | 66 | 75 | 69 | 55 | 27 |
| Tensile strength at 100° C., kg/cm$^2$ | 41 | 46 | 38 | 34 | 21 |
| Elastic modulus at 100% at 100° C., kg/cm$^2$ | 26 | 28 | 23 | 20 | 14 |
| Elastic resilience, % | 55 | 56 | 53 | 53 | 50 |
| Permanent compression set, % | 62 | 61 | 70 | 75 | 84 |

What is claimed is:

1. A rubber composition which comprises:
   (a) 100 parts by weight of natural rubber or a diene-based synthetic rubber;
   (b) from 5 to 100 parts by weight of a non-carbon inorganic filler; and
   (c) from 0.1 to 20 parts by weight of a polysulfide linkage-containing organopolysiloxane represented by the general formula

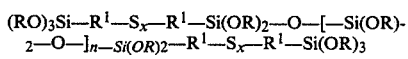
   $(RO)_3Si-R^1-S_x-R^1-Si(OR)_2-O-[-Si(OR)_2-O-]_n-Si(OR)_2-R^1-S_x-R^1-Si(OR)_3$ in which each R is, independently from the others, an alkyl group having from 1 to 4 carbon atoms, $R^1$ is a divalent hydrocarbon group having from 1 to 10 carbon atoms, x is a positive integer of from 2 to 6 and n is a positive integer of from 1 to 5.

2. The rubber composition as claimed in claim 1 wherein the divalent hydrocarbon group denoted by $R^1$ is a propylene group of the formula $-CH_2CH_2CH_2-$.

3. The rubber composition as claimed in claim 1 wherein the alkyl group denoted by R is a methyl or an ethyl group.

* * * * *